Jan. 16, 1923.

H. F. OBERJOHANN.
POWER MEANS FOR SCREW DRIVERS OR THE LIKE.
FILED NOV. 12, 1921.

1,442,174.

INVENTOR.
Henry F. Oberjohann,
By Owen Owen & Crampton,
Attys.

Patented Jan. 16, 1923.

1,442,174

UNITED STATES PATENT OFFICE.

HENRY F. OBERJOHANN, OF TOLEDO, OHIO, ASSIGNOR OF ONE-HALF TO GEORGE BUEHLER, OF TOLEDO, OHIO, AND ONE-HALF TO CLAYTON E. CHEESMAN, OF DAYTON, OHIO.

POWER MEANS FOR SCREW DRIVERS OR THE LIKE.

Application filed November 12, 1921. Serial No. 514,457.

*To all whom it may concern:*

Be it known that I, HENRY F. OBERJOHANN, a citizen of the United States, and a resident of Toledo, in the county of Lucas and State of Ohio, have made an invention appertaining to Power Means for Screw Drivers or the like; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to tools of the class having a rotary or rotary reciprocatory movement in use, such, for instance, as screw-drivers, socket-wrenches, or the like; and has for its object the provision, in connection with the shank of a tool of this class, of simple and efficient means capable of use as a laterally projecting lever or handle for exerting a more powerful turning movement on the tool than is possible through the handle proper thereof, said means being adjustable longitudinally of the shank and capable of turning movements around the same when in one position of its longitudinal adjusting movement.

The invention is fully described in the following specification, and while in its broader aspect it is capable of embodiment in numerous forms, a preferred embodiment thereof is illustrated in the accompanying drawings, in which,—

Figure 1:
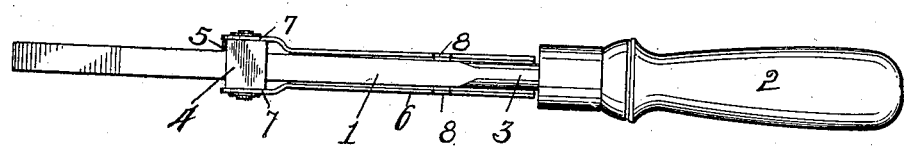
Figure 2:
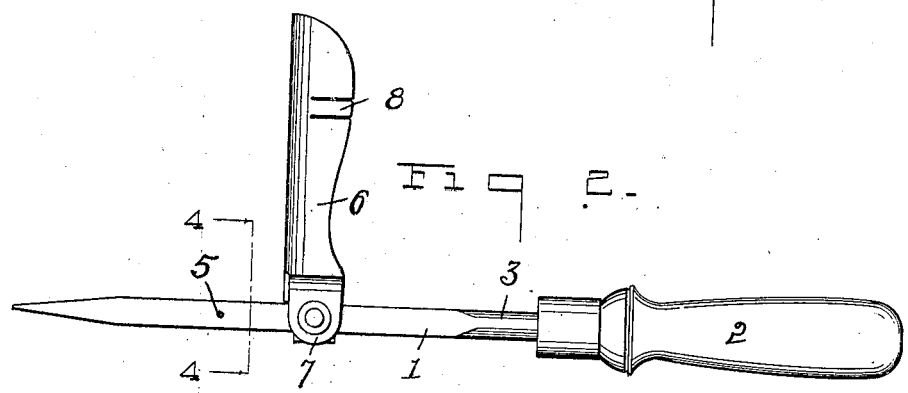
Figure 3:
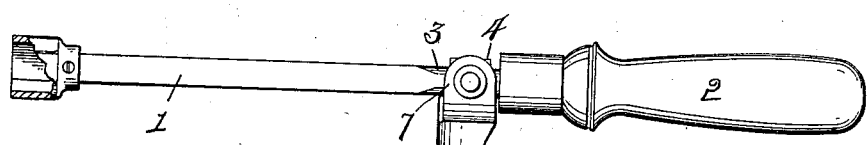
Figure 4:
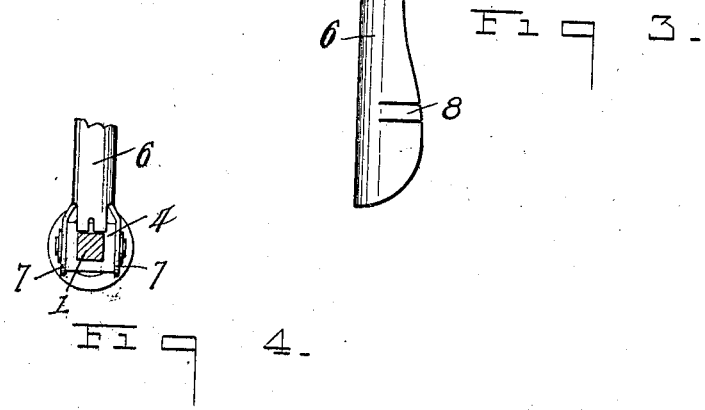

Fig. 1 is a side elevation of a screw-driver equipped with the means embodying the invention with the handle thereof in folded or inoperative position. Fig. 2 is a different side view thereof with the handle in open or operative position. Fig. 3 is a side elevation of a tool adapted for use as a socket-wrench equipped with the invention, with the lever handle in turning relation thereof and with a portion of the socket member broken away, and Fig. 4 is a section on the line 4—4 in Fig. 2 with a portion of the lever handle broken away.

Referring to the drawings, 1 designates the shank of a screw-driver, socket-wrench, or the like, which in Figs. 1 and 2 is shown as having its outer end adapted for use as a screw-driver, and in Fig. 3 as being adapted for use as a socket-wrench. The shank 1 is preferably squared in cross-section, but may be of any shape other than round as desired, and carries the customary handle 2 at its inner end. The shank adjacent to the handle 2 is provided with a reduced or rounded portion 3.

A block 4 having an opening therethrough complemental to the cross-sectional contour of the shank 1 is mounted on the shank for free sliding movements longitudinally thereof, having its outer movements thereon limited by a stop-pin 5 on the shank or by the socket forming end of the shank, while the inward movement of the block is limited by the handle 2. The block 4, when moved over the rounded portion 3 of the shank is adapted to have free turning movements thereon. A handle 6, which to distinguish it from the tool handle 2 may be referred to as a "lever handle", is pivoted at one end to the block 4 for swinging movements relative thereto longitudinally of the handle to enable it to be placed in a position to extend transversely of the tool shank or in a position to extend alongside of or longitudinally of the shank. In the present instance the lever handle 6 is of U form in cross-section, being formed from sheet metal, and at its inner end is provided with spaced ears 7, which receive the block 4 therebetween and are pivoted thereto, while the channel of the lever handle is adapted to receive the tool shank 1 when folded thereagainst. The opposite sides of the lever handle 6 are provided with spring tongues 8, which yieldingly engage opposite sides of the shank and tend to hold the lever handle in folded relation thereto.

It is evident that in the use of a tool equipped with my invention it may be placed in engagement with a screw, nut, bolt or other member to be turned and the lever handle 6 turned outward into usable position and a considerable turning leverage then applied through such handle to the shank. When the tool has been given a partial turning movement the lever handle is moved outward on the shank to place its block 4 over the rounded portion 3, which permits the lever handle to be turned back to the original starting position without removing the tool from engagement with the work, after which the lever handle is again moved to convenient working position on the squared portion of the shank and again turned to impart a turning movement to the work. It is thus evident that the tool may be operated in a manner similar to the operation of a ratchet-wrench except that it is necessary to move the lever handle outward into register with the rounded part 3 before each back turning movement of the handle.

I wish it understood that my invention is not limited to any specific construction, arrangement or form of the parts, or to use in connection with any particular form of tool, as it is capable of embodiment in numerous forms without departing from the spirit of the claims.

Having thus described my invention, what I claim as new, and desire to secure by Letters Patent, is,—

1. In a tool of the class described, a shank of other than circular form in cross section and having a reduced portion, a block mounted on the shank for sliding movements longitudinally thereof and adapted when turned about the shank axis to impart rotation to the shank except when in register with the reduced portion of the shank upon which it is adapted to have free turning movements, and a lever handle pivotally projecting from the block to adapt it to be placed in usable position transversely of the shank or in inoperative position longitudinally of the shank.

2. In a tool of the class described, a shank having a portion which is polygonal in cross-section and a rounded portion near one end, a handle carried by the rounded end portion of the shank, a block slidingly fitting on the polygonal portion of the shank and adapted to be moved into register with and have free turning movements on the rounded portion of the shank, and a lever handle U-shape in cross-section pivoted to the block to be placed in usable position at an angle to the shank or in nonusable position longitudinally of the shank, the lever handle being adapted to straddle the shank when in nonusable position and having means for yieldingly gripping the shank to hold it in such position.

In testimony whereof I have hereunto subscribed my name to this specification.

HENRY F. OBERJOHANN.